United States Patent [19]

Smith

[11] 4,148,726
[45] Apr. 10, 1979

[54] PROCESS FOR TREATMENT OF SEWAGE IN A GRAVITY SEWER

[76] Inventor: Kenneth C. Smith, Lunga House, Epping Rd., Roydon, Essex, England

[21] Appl. No.: 698,757

[22] Filed: Jun. 22, 1976

Related U.S. Application Data

[62] Division of Ser. No. 429,744, Jan. 2, 1974, abandoned.

[30] Foreign Application Priority Data

Jan. 8, 1973 [GB] United Kingdom ................. 1028/73
Mar. 1, 1973 [GB] United Kingdom ............... 10080/73

[51] Int. Cl.$^2$ ........................................... C02C 1/12
[52] U.S. Cl. ......................................... 210/9; 210/15; 210/170; 210/199
[58] Field of Search ..................... 210/15, 18, 96, 170, 210/192, 199, 220, 9

[56] References Cited

U.S. PATENT DOCUMENTS

| | | | |
|---|---|---|---|
| 1,371,406 | 3/1921 | Ball | 210/63 |
| 1,963,354 | 6/1934 | Currie | 210/63 |
| 3,335,082 | 8/1967 | Ullrich | 210/18 |
| 3,342,729 | 9/1967 | Bringle | 210/96 |
| 3,470,091 | 9/1969 | Budd et al. | 210/170 |
| 3,525,685 | 8/1970 | Edwards | 210/15 |
| 3,607,735 | 9/1971 | Hover | 210/170 |
| 3,664,951 | 5/1972 | Armstrong | 210/96 |
| 3,731,522 | 5/1973 | Mikesell | 210/96 |
| 3,826,742 | 7/1974 | Kirk et al. | 210/63 R |
| 3,872,003 | 3/1975 | Walker | 210/199 |

OTHER PUBLICATIONS

Process Design Manual for Sulfide Control in Sanitary Sewerage Systems, EPA, Oct. 1974, pp. 5-24-5-26.

Primary Examiner—Charles N. Hart
Assistant Examiner—Peter A. Hruskoci
Attorney, Agent, or Firm—Dennison, Dennison, Meserole & Pollack

[57] ABSTRACT

Pure oxygen or a gas containing more oxygen than air is injected under pressure into sewage held in or flowing through a sewer. This injection can be used to prevent the concentration of dissolved oxygen in the sewer falling to a level at which there occurs bacterial reduction to hydrogen sulfide of sulfate present in the sewage. The injection can also be used to oxidize to sulfur any sulfide dissolved in the sewage.

The pure oxygen or the gas containing more oxygen than air may be injected into sewage flowing through a sewage pipe forming part of a gravity sewer, into a pump used to transfer the sewage through the sewer, or into a part of the sewer where sewage is collected before being transferred through the sewer.

2 Claims, 1 Drawing Figure

U.S. Patent
Apr. 10, 1979
4,148,726
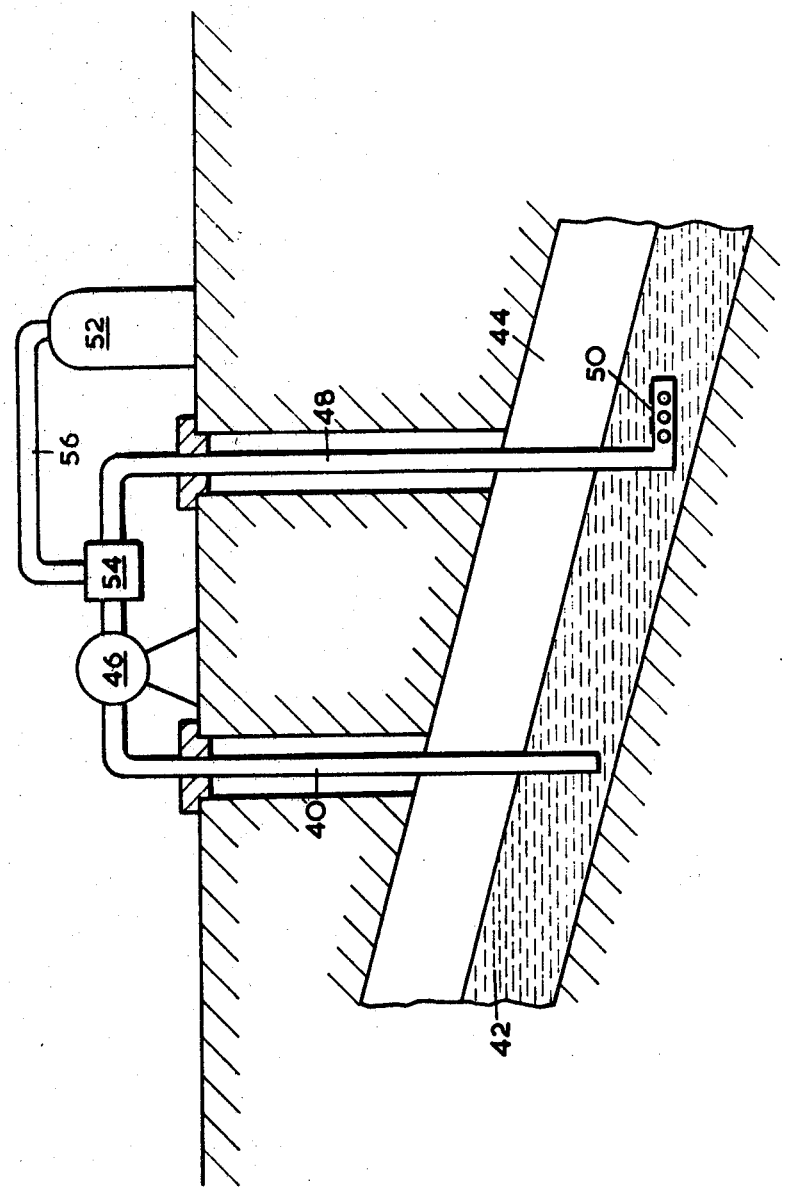

PROCESS FOR TREATMENT OF SEWAGE IN A GRAVITY SEWER

This is a division of application Ser. No. 429,744, filed Jan. 2, 1974, now abandoned.

BACKGROUND OF THE INVENTION

1. Field of the Invention

The invention relates to a process of, and apparatus for, treating sewage while it is flowing through a sewer.

2. Description of the Prior Art

Problems can arise in conveying sewage through gravity sewers as a result of the action of facultative bacteria present in the sewage. These bacteria normally respire oxygen dissolved in the sewage, but if this supply of oxygen is exhausted, they obtain their oxygen for respiration by reducing compounds containing oxygen, particularly sulfates.

This bacterial reduction of sulfates yields hydrogen sulfide, a malodorous, poisonous gas. Sometimes lethal concentrations of hydrogen sulfide are created at locations that are accessible to maintenance engineers, and there is frequently escape of hydrogen sulfide from the sewer to above ground. Formation of hydrogen sulfide is particularly marked under hot climatic conditions, since these conditions promote bacterial activity.

Another problem attributable to hydrogen sulfide is the corrosion of gravity sewers. This is caused by aerobic bacteria oxidising hydrogen sulfide to sulfuric acid on the damp walls of a gravity sewer in the air space above the level of the sewage.

Various methods have been tried in order to prevent the bacterial activity which forms hydrogen sulfide. For example, bacterial activity can be inhibited by the addition of gaseous chlorine, but this can result in the sterilization of the sewage. Moreover, chlorine itself is both highly corrosive and toxic.

It is possible to freshen sewage by adding air. With air, however, once a concentration of dissolved oxygen of 10 ppm has been attained, no more oxygen will dissolve. Furthermore, the sewage is usually saturated with nitrogen before the air is introduced. Accordingly, none of the nitrogen contained in the air is dissolved. This undissolved nitrogen can cause gas locks and other hydraulic problems in the sewer.

Proposals have been made to introduce pure oxygen into sewage being treated in the secondary stage of an activated sludge plant. Such a process is described in U.S. Pat. No. 3,607,735. But no proposal has been made to inject an oxygen-rich gas into a sewer.

SUMMARY OF THE INVENTION

It is an object of the invention to provide a process for preventing bacterial formation of hydrogen sulfide in a sewer or for oxidizing to sulfur any sulfide dissolved in the sewage.

It is another object of the invention to provide both a process which can be performed in an established gravity sewer and an apparatus which can be installed in an established gravity sewer.

According to the present invention there is provided a process of treating sewage while it is flowing through a sewer, in which an oxygen-rich gas selected from pure oxygen and a gas mixture containing more oxygen than does air is injected under pressure into the sewage in the sewer.

By this process there can be maintained a concentration of dissolved oxygen sufficient to prevent bacteria present in the sewage reducing compounds containing oxygen. Treatment with oxygen-rich gas can also oxidize any sulfide dissolved in the sewage.

The invention also provides for treating sewage while it is flowing through a sewer, including a source of oxygen-rich gas (as herein defined), a conduit connected between the source and at least one injector located in the sewer for the introduction of the oxygen-rich gas into the sewage.

The term "sewer" as used in this specification, includes within its scope a conduit which is connected between a source of untreated sewage and a treatment plant (e.g. an activated sludge or biological filtration plant) or, if the sewage is not to be treated in such a plant, a place of disposal. The term "sewer", as used in this specification, also includes within its scope any pumping equipment used to transfer sewage through the rest of a sewer.

The process according to the present invention can be performed in a gravity sewer. A gravity sewer slopes downwards in the direction of the flow of sewage therethrough so that the passage of the sewage is effected by gravity.

In a series of sewers, it is generally desirable to inject the oxygen-rich gas into a sewer sufficiently near to the source of the sewage to ensure that bacterial reduction of compounds containing oxygen and sulfur does not start before the sewage reaches the region where oxygen-rich gas is injected. If desired, oxygen-rich gas can be injected into more than one sewer in the series.

By the term "oxygen-rich gas", as used herein, is meant pure oxygen itself, or an oxygen-containing gas mixture having a proportion of oxygen greater than that of air.

The oxygen-rich gas can, if desired, include a small proportion of ozone or other gas which has a beneficial effect.

If desired, the oxygen-rich gas can be formed by enriching air in oxygen.

It is generally necessary to dissolve in the sewage substantially all the oxygen and any other gas contained in the oxygen-rich gas. Hence care should desirably be taken to ensure that substantially no insoluble gas be introduced into any volume of sewage contained within a sewer. It is therefore, in general, desirable to use an oxygen-rich gas which contains at least 90% by volume of oxygen, and which preferably contains at least 98% by volume of oxygen. This keeps to manageable proportions the amount of any unwanted gas, such as nitrogen, that needs to be dissolved in the sewage.

In performing the process according to the present invention it is usually not desirable to inject so much oxygen-rich gas at any one region as to exceed its solubility limit in the sewage. Consequently injection at discrete intervals along the length of the sewer or a sewerage system is sometimes desirable.

A variety of sources of oxygen-rich gas are available. For example, pure oxygen could be supplied from an insulated vessel in which liquid oxygen is stored and passed through an evaporator prior to its introduction into the sewage. Alternatively pure oxygen could be supplied from one or more gas storage cylinders. Oxygen-rich air could be supplied from an air separation plant operating a pressure swing adsorption-desorption cycle. If required, another gas or gases could be admixed with the oxygen or oxygen-enriched air.

The oxygen-rich gas may be conveniently injected into the sewer at a pressure in the range 1.5 to 5.0 bars. A pressure from 5 to 10 bars is also suitable.

The oxygen-rich gas is preferably injected into sewage in a rising sewer in fine bubbles, typically having a diameter of 0.05 to 0.15 mm, so as to facilitate its dissolution. In some instances, though, difficulties could arise in achieving substantially complete dissolution of the oxygen-rich gas. Such difficulties can, for example, occur in a gravity sewer where it is usually desirable, but often not possible, to introduce the oxygen-rich gas well below the level of the sewage.

In a gravity sewer failure to dissolve substantially all the oxygen in the oxygen-rich gas could be dangerous. This is because inflammable vapor is sometimes present in the air space above the level of the sewage. Thus undissolved oxygen entering the air space could cause an explosion.

In order to avoid any difficulty in effecting its dissolution, the oxygen-rich gas may first be introduced into a pressurized stream of sewage or water, which stream is then injected into the sewage in the sewer. The stream of sewage is preferably taken from sewage flowing through the sewer. This may be performed in accordance with the process described in United Kingdom applications 1027/73, 10082/73 and 30236/73, which are the applications corresponding to U.S. application Ser. No. 430,260, filed Jan. 3, 1974, now abandoned in favor of U.S. continuation-in-part application Ser. No. 586,390, filed June 12, 1975, copending herewith and assigned to a common assignee. The United Kingdom applications, and the corresponding United States applications, disclose the dispersing of oxygen-rich gas in a pressurized stream of liquid, such as sewage, to an oxygen level above saturation at the pressure of the stream of pressurized liquid, which inherently includes dissolution of some of the oxygen-rich gas until saturation is reached, as introduction of the gas proceeds in providing the super-saturated dispersion. Such a system is particularly suitable for use with a gravity main.

In many sewers there might be no access opening vertically above a region where it is desired to introduce the oxygen-rich gas. In such circumstances there can often be provided a rigid or flexible pipe which leads from the source of the oxygen-rich gas through an access opening in the sewer, extends along the sewer and terminates in the injector.

The outlets of the injector are preferably pointed in a downstream direction with reference to the sewage flow so as to reduce the tendency for solid matter to block the outlet or outlets.

The minimum quantity of oxygen-rich gas required to prevent the concentration of dissolved oxygen in the sewage from falling to or below a level at which there starts the bacterial reduction of compounds containing oxygen and sulfur depends on a number of factors. Important factors are the temperature of the sewage, the time for which the sewage is resident in the sewer, and the rate at which the sewage consumes dissolved oxygen. Also important are the internal dimensions of the sewer since populations of facultative bacteria tend to be present on the inner walls of the sewer. As all these parameters can be determined empirically the minimum quantity of oxygen-rich gas that needs to be injected into a given volumn of sewage can readily be calculated given a knowledge of the dissolved oxygen concentration of the incoming sewage. A dissolved oxygen meter can be used to measure the dissolved oxygen concentration.

The process according to the present invention can readily be performed in an established sewerage system. Moreover, the injection of oxygen-rich gas can help to reduce the BOD of the sewage.

The apparatus according to the present invention will now be described, by way of example, with reference to the FIGURE which is a schematic representation of a gravity sewer with apparatus for injecting oxygen into sewage flowing therethrough.

With reference to the FIGURE, a conduit 40 in communication with a volume of sewage 42 flowing downwards through a gravity sewer 44 leads upwards to the inlet of a high pressure pump 46 which is located above ground. The outlet of the pump 46 is connected to a conduit 48 which terminates in an injector pipe 50 located below the level of the inlet of the conduit 40. A pipe 56 is connected between a cylinder 52 containing compressed, pure oxygen and a chamber 54 located in the conduit 48 downstream of the pump 46.

In operation, 0.5 to 10% of the flow of sewage is withdrawn from the gravity sewer 44 through the conduit 40 by the pump 46 operating at a pressure of 40 psig. The so-formed pressurized stream of sewage passes into the conduit 48, and oxygen is injected under pressure into it in the chamber 54. This forms an oxygenated stream of sewage which is then introduced back into the sewage flowing through the gravity sewer by the injector pipe 50.

I claim:

1. In a process of treating sewage while it is flowing through a gravity sewer, in which pure oxygen or an oxygen-rich gas is introduced into the sewage, the improvement comprising pressurizing a stream of sewage comprising a portion of sewage withdrawn from the sewer in an amount of 0.5 to 10% of the flow of sewage in the sewer, introducing pure oxygen or oxygen-rich gas into the withdrawn pressurized portion in a minimum quantity required to prevent the concentration of dissolved oxygen in the sewage to be treated from falling to a level at which bacterial reduction of oxygen and sulfur containing compounds in the sewage would start, which pressurized stream is then injected under pressure of 1.5 to 10 bars into the sewage in the sewer at a point downstream of the withdrawal of said portion, the amount of oxygen or oxygen-rich gas being such that it is substantially all dissolved in the sewage without significant accumulation of free oxygen in any headspace in the sewer, whereby bacterial formation of hydrogen sulfide is prevented and any of the hydrogen sulfide dissolved in the sewage is oxidized to sulfur generally without creation of a potentially explosive atmosphere in any headspace in the sewer.

2. A process according to claim 1, in which the oxygen-rich gas-containing pressurized stream is injected in at least two separate regions of the sewer.

* * * * *